(12) United States Patent
Bayesteh et al.

(10) Patent No.: US 10,581,552 B2
(45) Date of Patent: Mar. 3, 2020

(54) SYSTEMS AND METHODS FOR WAVEFORM SELECTION AND ADAPTATION

(71) Applicant: Huawei Technologies Co., Ltd., Shenzhen (CN)

(72) Inventors: Alireza Bayesteh, Ottawa (CA); Hosein Nikopour, San Jose, CA (US); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/965,144

(22) Filed: Apr. 27, 2018

(65) Prior Publication Data

US 2018/0248645 A1 Aug. 30, 2018

Related U.S. Application Data

(63) Continuation of application No. 15/630,085, filed on Jun. 22, 2017, which is a continuation of application (Continued)

(51) Int. Cl.
*H04L 1/00* (2006.01)
*H04W 72/02* (2009.01)
(Continued)

(52) U.S. Cl.
CPC .......... *H04L 1/0001* (2013.01); *H04W 72/02* (2013.01); *H04W 72/048* (2013.01); *H04W 72/0413* (2013.01); *H04W 88/02* (2013.01)

(58) Field of Classification Search
CPC ..... H04L 5/001; H04L 5/0053; H04L 1/1812; H04L 1/0001; H04W 76/15;
(Continued)

(56) References Cited

U.S. PATENT DOCUMENTS 6,385,434 B1 5/2002 Chuprun et al.
7,020,177 B2 3/2006 Leeper et al.
(Continued)

FOREIGN PATENT DOCUMENTS

CN 1753343 A 3/2006
CN 101112005 A 1/2008
(Continued)

OTHER PUBLICATIONS

Wang, P., et al., "Comparison of Orthogonal and Non-Orthogonal Approaches to Future Wireless Cellular Systems," Vehicular Technology Magazine, IEEE vol. 1, Issue 3, Sep. 2006, pp. 4-11.

*Primary Examiner* — Will W Lin
(74) *Attorney, Agent, or Firm* — Slater Matsil, LLP

(57) ABSTRACT

Systems, methods, and apparatuses for providing waveform adaptation are provided. In an example, a method is provided for identifying a plurality of candidate waveforms, and selecting one of the candidate waveforms for data transmission. The candidate waveforms may be identified in accordance with one or more criteria, such as a transmission capability of the transmitting device, a reception capability of the receiving device, a desired Peak-to-Average-Power-Ratio (PAPR) characteristic, adjacent channel interference (ACI) rejection requirements, spectrum localization requirements, and other criteria. The waveform selected for data transmission may be selected in accordance with one or more waveform selection criteria, such as traffic characteristic, application types, etc.

21 Claims, 6 Drawing Sheets

Related U.S. Application Data

No. 13/688,926, filed on Nov. 29, 2012, now Pat. No. 9,692,550.

(51) Int. Cl.
*H04W 72/04* (2009.01)
*H04W 88/02* (2009.01)

(58) Field of Classification Search
CPC ............... H04W 72/048; H04W 72/02; H04W 72/0413; H04W 88/02
See application file for complete search history.

(56) References Cited

U.S. PATENT DOCUMENTS

| | | | |
|---|---|---|---|
| 7,606,713 B2 | 10/2009 | Thorner | |
| 7,714,643 B1 | 5/2010 | Wang et al. | |
| 8,249,591 B2 | 8/2012 | Tod et al. | |
| 8,682,331 B2 | 3/2014 | Nagaraja et al. | |
| 8,897,394 B1 | 11/2014 | Nabar et al. | |
| 8,914,034 B2 | 12/2014 | Hu et al. | |
| 8,977,303 B2* | 3/2015 | Fang | H04W 36/0022 455/466 |
| 9,271,290 B2 | 2/2016 | Pelletier et al. | |
| 2003/0147358 A1 | 8/2003 | Hiramatsu et al. | |
| 2004/0179494 A1 | 9/2004 | Attar et al. | |
| 2006/0050799 A1* | 3/2006 | Hou | H04J 13/0062 375/260 |
| 2006/0063543 A1 | 3/2006 | Matoba et al. | |
| 2006/0133522 A1 | 6/2006 | Sutivong et al. | |
| 2006/0203845 A1 | 9/2006 | Monogioudis | |
| 2007/0081604 A1 | 4/2007 | Khan et al. | |
| 2008/0013476 A1* | 1/2008 | Vasudevan | H04B 1/707 370/328 |
| 2008/0291821 A1 | 11/2008 | Dent | |
| 2009/0120636 A1 | 5/2009 | Summerfield et al. | |
| 2009/0201869 A1 | 8/2009 | Xu et al. | |
| 2009/0201872 A1 | 8/2009 | Gorokhov et al. | |
| 2009/0252099 A1* | 10/2009 | Black | H04L 25/03343 370/329 |
| 2010/0067591 A1 | 3/2010 | Luo et al. | |
| 2010/0202349 A1 | 8/2010 | Guan | |
| 2011/0116383 A1* | 5/2011 | Lipka | H04L 5/0058 370/241 |
| 2011/0200129 A1 | 8/2011 | Hwang et al. | |
| 2011/0255412 A1 | 10/2011 | Ngai | |
| 2011/0273999 A1 | 11/2011 | Nagaraja | |
| 2012/0140743 A1* | 6/2012 | Pelletier | H04W 72/0453 370/335 |
| 2012/0184327 A1* | 7/2012 | Love | H04B 1/0064 455/552.1 |
| 2012/0195216 A1 | 8/2012 | Wu et al. | |
| 2012/0208534 A1 | 8/2012 | Swaminathan | |
| 2012/0300752 A1* | 11/2012 | Kwon | H04W 56/0005 370/336 |
| 2012/0320829 A1 | 12/2012 | Onishi | |
| 2013/0028069 A1 | 1/2013 | Pelletier et al. | |
| 2013/0058315 A1 | 3/2013 | Feuersänger et al. | |
| 2013/0194917 A1 | 8/2013 | Melsen et al. | |
| 2013/0201850 A1* | 8/2013 | Swaminathan | H04W 72/1215 370/252 |
| 2013/0242965 A1* | 9/2013 | Horn | H04W 24/10 370/338 |
| 2013/0244656 A1 | 9/2013 | Heo et al. | |
| 2013/0279632 A1 | 10/2013 | Kim et al. | |
| 2014/0003301 A1 | 1/2014 | Madan et al. | |
| 2014/0029586 A1 | 1/2014 | Loehr et al. | |
| 2014/0064068 A1* | 3/2014 | Horn | H04W 28/0289 370/230 |
| 2014/0086172 A1 | 3/2014 | Kwon et al. | |
| 2015/0156764 A1* | 6/2015 | Yang | H04L 1/0076 370/329 |
| 2019/0028980 A1 | 1/2019 | Feuersaenger et al. | |

FOREIGN PATENT DOCUMENTS

| | | |
|---|---|---|
| CN | 101385271 A | 3/2009 |
| CN | 101926139 A | 12/2010 |
| CN | 102150387 A | 8/2011 |
| EP | 1701458 A2 | 9/2006 |
| EP | 1998586 A1 | 12/2008 |
| EP | 2259632 A1 | 12/2010 |
| WO | 2005015775 A1 | 2/2005 |

\* cited by examiner

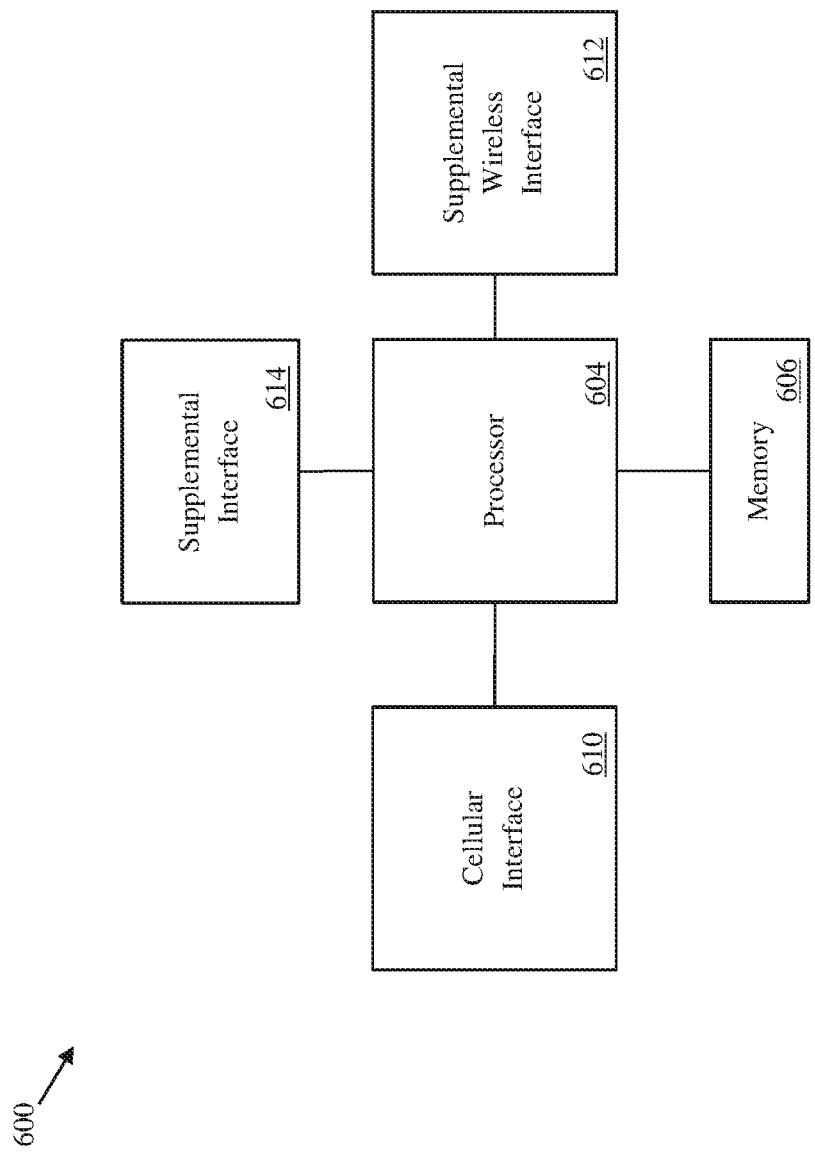

SYSTEMS AND METHODS FOR WAVEFORM SELECTION AND ADAPTATION

CROSS-REFERENCE TO RELATED APPLICATIONS

This application is a continuation of U.S. patent application Ser. No. 15/630,085, filed on Jun. 22, 2017 and entitled "Systems and Methods for Waveform Selection and Adaptation," which application is a continuation of U.S. patent application Ser. No. 13/688,926 filed on Nov. 29, 2012 (now U.S. Pat. No. 9,692,550 issued Jun. 27, 2017) and entitled "Systems and Methods for Waveform Selection and Adaptation," both of which applications are hereby incorporated by reference herein as if reproduced in their entireties.

TECHNICAL FIELD

The present invention relates generally to wireless communications, and, in particular embodiments, to techniques for selecting waveforms for carrying wireless signals.

BACKGROUND

In modern wireless networks, a single waveform type is generally used for uplink communications, as well as downlink communications. For instance, fourth generation (4G) long term evolution (LTE) networks utilize an orthogonal frequency division multiple access (OFDMA) waveform for downlink communications and a single-carrier frequency division multiple access (SC-FMDA) waveform for uplink communications. Conversely, 4G Evolved High-Speed Downlink Packet Access (HSDPA+) networks utilize a code division multiple access (CDMA) waveform for both uplink and downlink communications. Because each waveform has its own advantages/disadvantages, no single waveform is optimal for all applications. As such, the performance of conventional wireless networks is limited by virtue of using a single waveform.

SUMMARY OF THE INVENTION

Technical advantages are generally achieved by preferred embodiments of the present invention which describe systems and methods for waveform selection and adaptation.

In accordance with an embodiment, method of waveform adaptation is provided. In this example, the method includes establishing a wireless link extending between a transmitting device and a receiving device, identifying a plurality of candidate waveforms for transporting traffic over the wireless link, selecting one of the plurality of candidate waveforms in accordance with a waveform selection criteria, and communicating the traffic over the wireless link using the selected candidate waveform. Apparatuses for transmitting and receiving the traffic in accordance with this method are also provided.

In accordance with another embodiment, another method of waveform adaptation is provided. In this example, the method includes receiving a grant request from a transmit point. The grant request requests resources for communicating traffic in a channel of a wireless network. The method further includes establishing a wireless link in the channel, identifying a plurality of candidate waveforms in accordance with a capability of the transmit point, selecting one of the plurality of candidate waveforms in accordance with a traffic characteristic of the traffic, sending a grant response that identifies the selected candidate waveform, and receiving a transmission carried by the selected waveform from the transmit point. The transmission includes the traffic. An apparatus for performing this method is also provided.

In accordance with yet another embodiment, another method of waveform adaptation is provided. The method includes receiving a first data transmission in accordance with a first waveform type via a channel, and receiving a second data transmission in accordance with a second waveform type via the channel. The second waveform type is different than the first waveform type, and first data transmission is received over different time-frequency resources of the channel than the first data transmission. Both the first data transmission and the second data transmission comprise at least some data that is not classified as signaling or control information. An apparatus for performing this method is also provided.

In accordance with yet another embodiment, another method of waveform adaptation is provided. In this example, the method includes transmitting a first data transmission using a first waveform type in a channel, and transmitting a second data transmission using a second waveform type in the channel. The second waveform type is different than the first waveform type, and the second data transmission is transmitted over different resources of the channel than the first data transmission. The first data transmission and the second data transmission comprise at least some data that is not classified as signaling or control information. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 illustrates a diagram of an embodiment of a communications device.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

As discussed above, conventional wireless networks use a single, statically selected, waveform throughout the life of the network. However, no single waveform is ideal for all conditions/situations. By way of example, OFDMA waveforms exhibit comparatively high scheduling gain by virtue of frequency selective scheduling (FSS), which allows OFDMA waveforms to outperform interleaved frequency division multiple access (IFDMA) waveforms when wireless channel conditions are good. By comparison, IFDMA waveforms can exhibit comparatively less out-of-band (OOB) interference by virtue of their low Peak-to-Average-Power-Ratio (PAPR) characteristics, which allows IFDMA waveforms to be able to outperform OFDMA waveforms when wireless channel conditions are poor. Other categories of waveforms also exhibit advantages and disadvantages. For instance, non-orthogonal waveforms provide higher throughput, while orthogonal waveforms require less processing/computational capacity (making them less burdensome to transmit and receive). As a consequence of using a single, statically-selected, waveform, conventional wireless networks are unable to adjust to changes in network conditions (e.g., transmission and reception condition, traffic load, latency requirements, etc.), thereby leading to inefficiencies and reduced performance. Accordingly, a mechanism for waveform adaptation is desired.

Aspects of this disclosure provide a mechanism for adapting between various waveforms in accordance with network conditions and/or traffic requirements, as well as an architecture for supporting multiple waveforms concurrently in a single downstream or upstream channel. In an embodiment, waveform adaptation includes identifying a plurality of candidate waveforms in accordance with a UE's and/or transmit point (TP) capability, and thereafter selecting one of the candidate waveforms for data transmission in accordance with a traffic characteristic or a network condition. In embodiments, different waveforms may coexist in a single upstream or downstream channel by scheduling, or otherwise reserving, different time-frequency resources (e.g., frequency bands, timeslots, etc.) for different waveforms.

Figure 1:
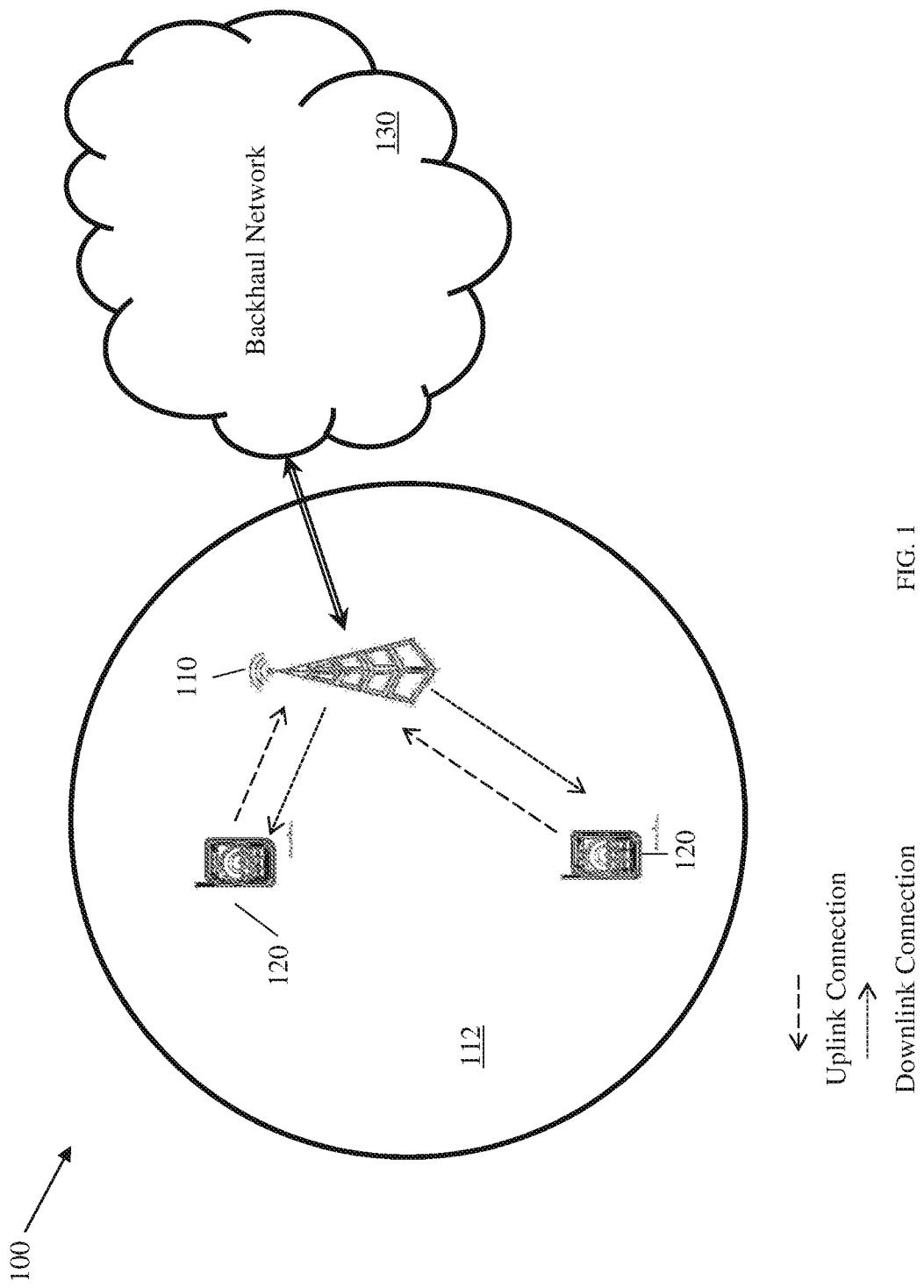
FIG. 1 illustrates a diagram of a communications network.

FIG. 1 illustrates a network 100 for communicating data. The network 100 comprises a transmit point (TP) no having a coverage area 112, a plurality of user equipments (UEs) 120, and a backhaul network 130. As discussed herein, the term transmit point (TP) may refer to any device used to transmit a wireless signal to another device, including a UE, a base station, an enhanced base station (eNB), a femtocell, etc. For instance, TPs may be a UE in an uplink communication or a device-to-device (D2D) communication. The TP 110 may be any component capable of providing wireless access to the UEs 120-125. The TP 110 may provide wireless access by, inter alia, establishing an uplink connection (dashed line) and/or a downlink connection (dotted line) with the UEs 120-125. The UEs 120-125 may be any component or collection of components that allow a user to establish a wireless connection for purposes of accessing a network, e.g., the backhaul network 130. The backhaul network 130 may be any component or collection of components that allow data to be exchanged between the TP 110 and a remote end (not shown). In some embodiments, the network 100 may comprise various other wireless devices, such as relays, femtocells, etc.

Figure 2:
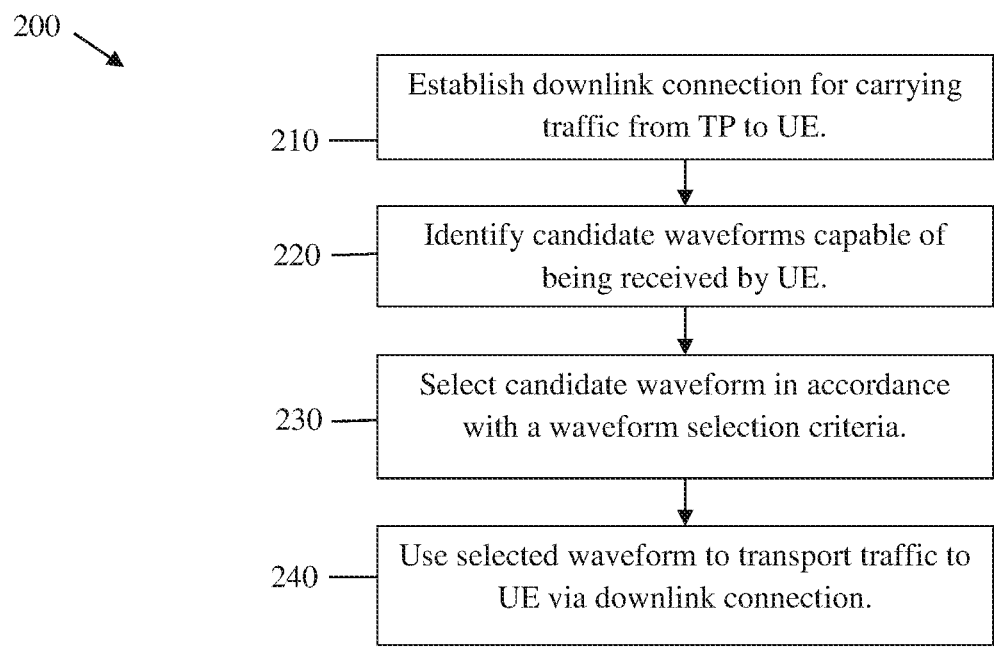
FIG. 2 illustrates an embodiment of a method for performing waveform adaptation.

FIG. 2 illustrates an embodiment of a method 200 for performing waveform adaptation over a downlink connection. The method 200 begins at step 210, where a downlink connection is established for carrying traffic from the TP to the UE. Next, the method 200 proceeds to step 220, where a plurality of candidate waveforms are identified in accordance with a reception and/or processing capability of the UE. In some embodiments, the processing capability of the UE corresponds to an ability (or inability) to perform complex computation techniques, as may be required to process, inter alia, non-orthogonal waveforms. In embodiments, the step 220 may also consider the transmission and/or processing capabilities of the TP. Next, the method 200 proceeds to step 230, where one of the candidate waveforms is selected in accordance with a waveform selection criteria. In an embodiment, the waveform selection criteria may include a traffic characteristic and/or an application type. In the same or other embodiments the waveform selection criteria may include an adjacent channel interference (ACI) rejection requirement and/or a spectrum localization requirement. Adjacent-channel interference (ACI) is interference caused by extraneous power from a signal in an adjacent channel. Depending on the application scenario, different level of ACI rejection may be needed. For example, to make use of some gaps between two occupied spectrums, the transmitter which transmits over the gap should not cause extra emission to the existing spectrum and therefore should better restrict the out-of-band emissions. Different waveforms may have different spectrum location feature. Spectrum localization may refer to the propensity of a waveform to generate interference in neighboring frequency bands, and may be a consideration in applications (e.g., cognitive radio) that have require low inter-channel interference. In some embodiments, the traffic characteristic relates to a latency, QoS, or reliability constraint associated with a traffic type of the data to be transmitted. For example, if the traffic type requires low-latency (e.g., mobile gaming), then a waveform offering grant-less access (e.g., CDMA) may be selected. Alternatively, if the traffic type requires high reliability or high-bandwidth (e.g., transactional traffic, video, etc.), then a waveform offering grant-based access (e.g., non-CDMA, etc.) may be selected. As discussed herein, waveforms offering grant-less access do not require the transmit point to communicate/signal grant information to the receiving device prior to transmitting the data, while waveforms offering grant-based access require the transmit point to communicate/signal grant information to the receiving device prior to transmitting the data. For instance, a contention-based access channel (e.g., a random access channel) may be grant-less, while a TDMA channel may be grant-based. After selecting the waveform, the method 200 proceeds to step 240, where selected waveform is used to transport traffic to the UE via the downlink connection. Although the method 200 can be implemented by any network component at any time, it may typically be performed by the TP upon receiving downlink data (e.g., data destined for the UE) from the backhaul network or another UE.

Figure 3:
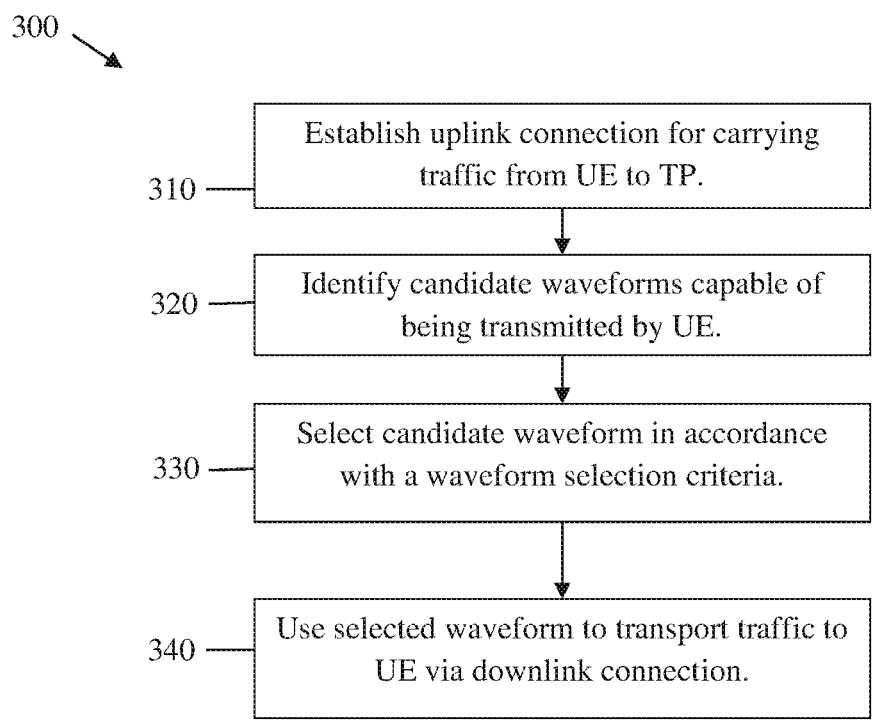
FIG. 3 illustrates another embodiment of a method for performing waveform adaptation.

FIG. 3 illustrates an embodiment of a method 300 for performing waveform adaptation over an uplink connection. The method 300 begins at step 310, where an uplink connection is established for carrying traffic from the UE to the TP. Next, the method 300 proceeds to step 320, where a plurality of candidate waveforms are identified in accordance with a transmission and/or processing capability of the UE. In embodiments, the step 320 may also consider the reception and/or processing capabilities of the TP. Next, the method 300 proceeds to step 330, where one of the candidate waveforms is selected in accordance with a waveform selection criteria. In an embodiment, the waveform selection criteria may include a traffic characteristic and/or an application type. In the same or other embodiments the waveform selection criteria may include an ACI rejection requirement and/or a spectrum localization requirement. Although the method 300 can be implemented by any network component at any time, it may typically be performed either by the TP upon (e.g., upon receiving an uplink grant request from the UE) or by the UE (e.g., before sending an uplink grant request to the TP). In some embodiments, the UE may be preconfigured to send data of a certain type (e.g., low-latency, low-load traffic, etc.) over a frequency sub-band reserved for grant-less waveforms, thereby avoiding the overhead associated with uplink grant requests.

Figure 4:
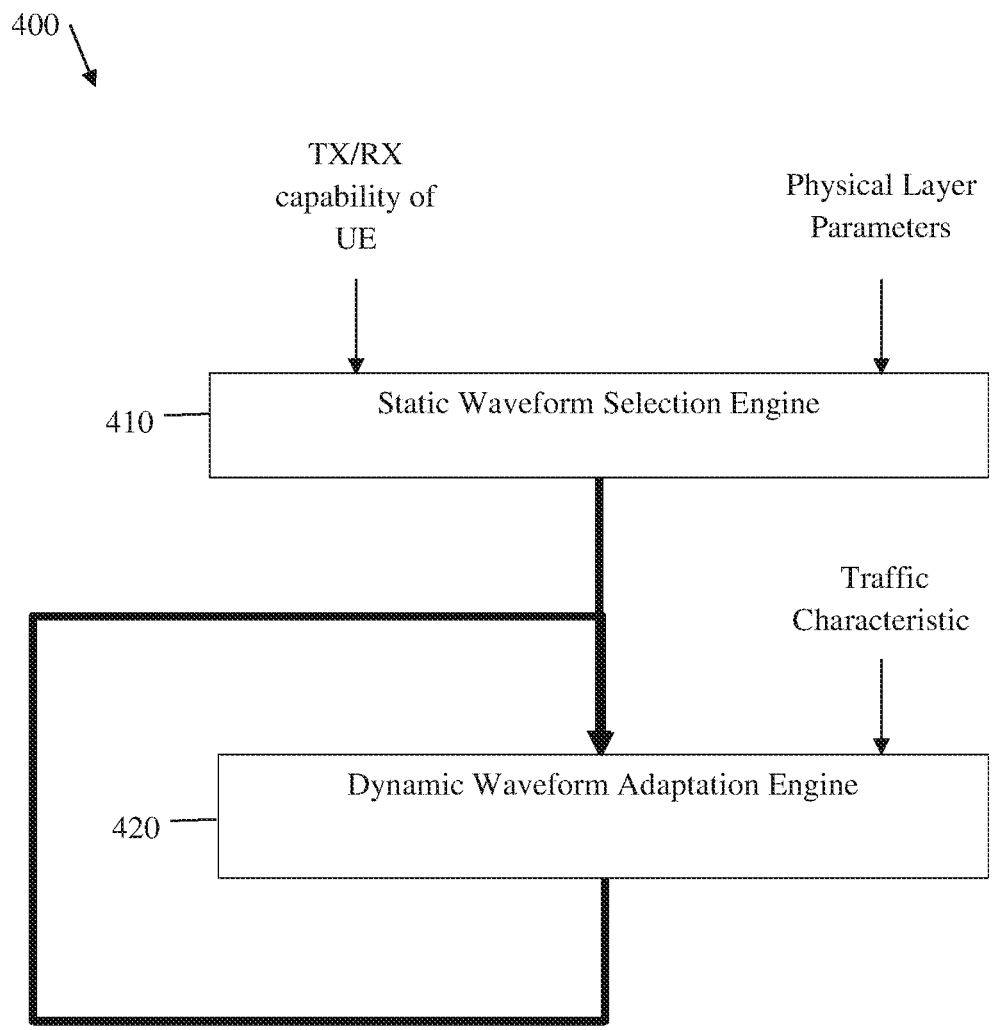
FIG. 4 illustrates a diagram of a component for performing multi-stage waveform adaptation.

FIG. 4 illustrates a high-level diagram of a component 400 for performing multi-stage waveform adaptation. The component 400 comprises a static waveform adaptation engine 410 and a dynamic waveform adaptation 420. The static waveform adaptation engine 410 is configured to perform a first stage of waveform adaptation to identify a plurality of candidate waveforms. In an embodiment, the candidate waveforms may be identified in accordance with a transmission or reception (TX/RX) capability of the UE as well as physical layer parameters (e.g., PAPR, etc.). The dynamic waveform selection engine 420 is configured to perform a second stage of waveform adaptation by selecting one of the plurality of identified candidate waveforms for data transmission. In an embodiment, the dynamic waveform selection engine may select the candidate waveform in accordance with a traffic characteristic or application type. In some embodiments, the static waveform selection 410 may execute the first stage of waveform adaption once (e.g., upon formation of the uplink/downlink connection between the TP and/or UE), while the dynamic waveform selection engine 420 may be configured to perform the second stage of waveform adaption repeatedly (e.g., on a periodic basis). In such embodiment, the waveform may be adapted dynamically in accordance with changing traffic characteristics and/or network conditions. The dynamic waveform selection engine 420 may also physical layer parameters (e.g., PAPR, etc.), particularly during subsequent iterations so as to account for changes in wireless channel conditions.

Figure 5:
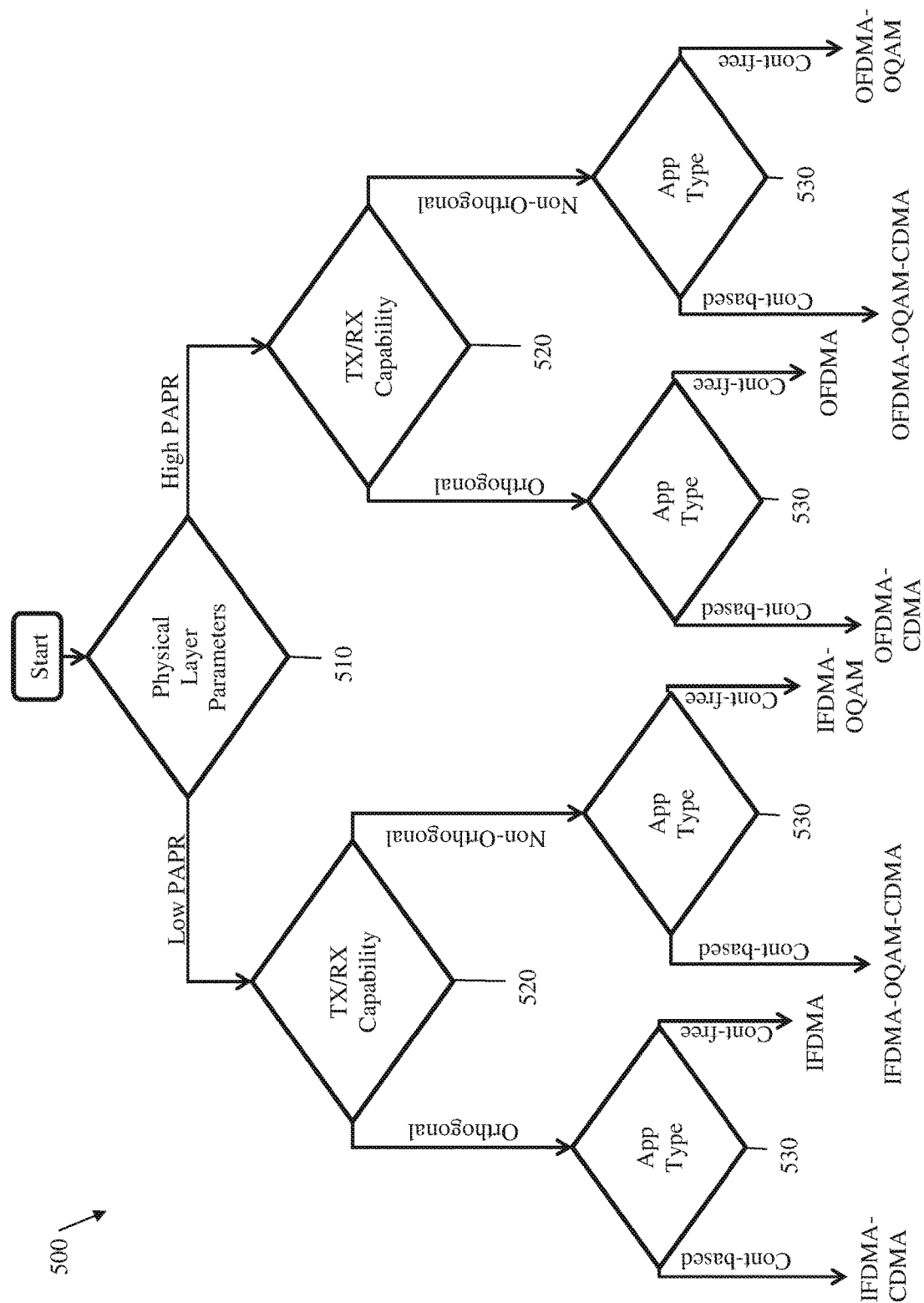
FIG. 5 illustrates another embodiment of a method for performing waveform adaptation.

FIG. 5 illustrates an embodiment of a method 500 for adaptive waveform selection. The method 500 begins at step 510, where physical layer parameters and/or the TP's Peak-to-Average Power Ratio (PAPR) tolerance are evaluated to determine whether a high or low PAPR waveform is desired. Notably, PAPR tolerance may correspond to a pulse shaping capability of the transmitting device, and may be related radio frequency power amplifier performance, e.g., linearity, etc. Additionally, PAPR is a characteristic which significantly affects a waveform's propensity for generating interference in adjacent channels. Specifically, high PAPR waveforms (e.g., OFDMA, etc.) tend to exhibit higher out-of-band interference than low PAPR waveforms (e.g., interleaved frequency division multiple access (IFDMA), etc.), particularly as transmit power is increased. Consequently, high PAPR waveforms may produce higher bit error rates in adjacent frequency sub-bands for high transmit-power data transmission (e.g., when channel gain is low), thereby resulting in lower network throughput. The tendency for high PAPR waveforms to produce or exhibit higher out-of-band interference is primarily attributable to power amplifier non-linearity. Even so, high PAPR waveforms (e.g., OFDMA, etc.) generally provide better spectral efficiency than low PAPR waveforms (e.g., IFDMA, etc.).

The method 500 then proceeds to step 520, where the UE's TX/RX capabilities are evaluated to determine whether an orthogonal or non-orthogonal waveform is desired. Notably, the TP's TX/RX capabilities may also be considered. However, from a practical standpoint, it may typically be the TX/RX capabilities of the mobile device that limit waveform selection. The TX/RX capabilities may correspond to the UE's ability to perform complex processing techniques, as may typically be required of non-orthogonal waveforms. Notably, the UE's ability to perform complex processing techniques (e.g., equalization for interference cancellation, MIMO detection, channel estimation to make up for lack of cyclic prefix, etc.) may enable the use of waveforms that rely on advanced modulation techniques. Thereafter, the method 500 proceeds to step 530, where the application type is evaluated to determine whether a grant-less or a grant-based waveform is desired. A grant-less waveform (e.g., CDMA, etc.) may be selected if, for example, an application or traffic type has a low latency requirement, so as to avoid scheduling-related latency. Likewise, a grant-less waveform may be selected when there is a relatively small amount of data to transmit, so as to avoid the scheduling-related overhead. Alternatively, a grant-based waveform (e.g., non-CDMA, etc.) may be selected if, for example, an application or traffic type has a high reliability requirement, to reduce packet-error rates, or when there is a relatively large amount of data to transmit, to avoid having to re-transmit large amounts of data.

In some embodiments, the steps 510-520 may be performed during a first stage of waveform selection (e.g., during static waveform selection), while the step 530 may be performed during a second stage of waveform selection (e.g., during dynamic waveform selection). Depending on the outcome of the steps 510-530, one of a pool of possible waveforms will be chosen for data transmission. In an embodiment, static waveform selection may be performed once (e.g., upon identifying the wireless link for transmission), while dynamic waveform selection may be performed periodically or semi-periodically in accordance with a dynamic waveform adaptation period. The pool of possible waveforms may include any waveform that is capable of carrying a wireless transmission, including, but not limited to, IFDMA, OFDMA, CDMA, OQAM, and their derivatives (e.g., IFDMA-CDMA, IFDMA-OQMA, OFDMA-CDMA, etc.). Each waveform in the pool of possible waveforms may have their own distinct advantages and/or disadvantages. By way of example, OFDMA exhibits high PAPR and high scheduling gain through frequency selective scheduling (FSS), while IFDMA, by comparison, exhibits low PAPR and low frequency diversity. By way of another example, pre-coded OFDM (e.g., single carrier (SC)-FDMA, etc.) exhibits mid-to-low PAPR and low frequency diversity, while OFDM-CDMA exhibits high PAPR, scheduling-flexibility, and interference whitening for better link adaptation. Further still, various waveforms within the same class may exhibit different characteristics. For instance, some non-orthogonal waveforms (e.g., OFDM-OQAM) may exhibit lower OBB interference than other non-orthogonal waveforms due to better frequency localization. As another example, OFDMA-QQAM may be pre-coded to achieve lower PAPR, or combined with CDMA to achieve contention based access.

When data originates from a single TP, multiple waveforms can co-exist in a single channel (downlink, uplink, or otherwise) by assigning different waveforms to carry different traffic streams (different data-transmissions). By way of example, a single TP may simultaneously transmit a video signal via a grant-based waveform, and transmit a short message service (SMS) message via a grant-less waveform.

Multiple waveforms can also co-exist in a single channel (downlink, uplink, or otherwise) when the data originates from multiple TPs (or a single TP) by scheduling different waveforms to different time-frequency resources (e.g., frequency bands, time-slots/frames, etc.). This scheduling may be performed in a static, semi-static, or dynamic fashion. In one example, some frequency bands may be reserved for one category of waveforms (e.g., grant-less, orthogonal, etc.), while other frequency bands may be reserved for other categories of waveforms (e.g., grant-based, non-orthogonal, etc.). For instance orthogonal and non-orthogonal waveforms may be communicated in different frequency bands, with the frequency band scheduling/assignment being performed statically, semi-statically, or dynamically. Waveform segregation can also be achieved in the spatial domain, for instance, by using a grant-less waveform for beam targeting at the cell-edge and a grant-based waveform for beam targeting at the cell center. Low and high PAPR waveforms can coexist over any dimension.

FIG. 6 illustrates a block diagram of an embodiment of a communications device 600, which may be implemented as one or more devices (e.g., UEs, TPs, etc.) discussed above. The communications device 600 may include a processor 604, a memory 606, a cellular interface 610, a supplemental wireless interface 612, and a supplemental interface 614, which may (or may not) be arranged as shown in FIG. 6. The processor 604 may be any component capable of performing computations and/or other processing related tasks, and the memory 606 may be transient or non-transient and may be any component capable of storing programming and/or instructions for the processor 604. The cellular interface 610 may be any component or collection of components that allows the communications device 600 to communicate using a cellular signal, and may be used to receive and/or transmit information over a cellular connection of a cellular network. The supplemental wireless interface 612 may be any component or collection of components that allows the communications device 600 to communicate via a non-cellular wireless protocol, such as a Wi-Fi or Bluetooth protocol, or a control protocol. The supplemental interface 614 may be component or collection of components that allows the communications device 600 to communicate via a supplemental protocol, including wire-line protocols. In embodiments, the supplemental interface 614 may allow the device 600 to communicate with a backhaul network.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The following examples are supported and enabled by this patent application.

In one embodiment, a method of waveform adaptation is provided. In such an embodiment, the method includes establishing a wireless link between a transmitting device and a receiving device, identifying a plurality of candidate waveforms for transporting traffic over the wireless link, selecting one of the plurality of candidate waveforms in accordance with a waveform selection criteria, and communicating the traffic over the wireless link using the selected candidate waveform. In one example, identifying the plurality of candidate waveforms comprises identifying candidate waveforms, out of a plurality of possible waveforms, that are both capable of being transmitted by the transmitting device and capable of being received by the receiving device. In the same example, or another example, identifying the plurality of candidate waveforms is performed statically upon identifying the wireless link, and wherein selecting one of the plurality of candidate waveforms in accordance with a waveform selection criteria is performed dynamically in accordance with a dynamic waveform adaptation period.

In any one of the preceding examples, or in another example, identifying the plurality of candidate waveforms comprises determining whether the receiving device is capable of non-orthogonal signal processing, identifying at least some non-orthogonal waveforms as candidate waveforms if the receiving device is capable of non-orthogonal signal processing, and identifying only orthogonal waveforms as candidate waveforms if the receiving device is incapable of non-orthogonal signal processing.

In any one of the preceding examples, or in another example, identifying the plurality of candidate waveforms comprises determining a Peak-to-Average-Power-Ratio (PAPR) tolerance of the transmitting device and identifying candidate waveforms, out of a plurality of possible waveforms, having PAPR characteristics within the PAPR tolerance of the transmitting device, where waveforms having PAPR characteristics beyond the PAPR tolerance of the transmitting device are excluded from the plurality of candidate waveforms. In any one of the preceding examples, or in another example, the waveform selection criteria includes a traffic characteristic of the traffic or an application type of the traffic. In any one of the preceding examples, or in another example, selecting one of the plurality of candidate waveforms comprises determining, in accordance with the traffic characteristic or the application type, whether grant-based access or grant-less access is better suited for transporting the traffic, selecting one of the plurality of candidate waveforms that offers grant-less access in response to determining that grant-less access is better suited for transporting the traffic, and selecting one of the plurality of candidate waveforms that offers grant-based access in response to determining that grant-based access is better suited for transporting the traffic. In any one of the preceding examples, or in another example, waveforms offering grant-based access require that scheduling information be communicated to the receiving device before communicating the traffic over the wireless link, and waveforms offering grant-less access do not require that scheduling information be communicated to the receiving device before communicating the traffic over the wireless link. In any one of the preceding examples, or in another example, the traffic characteristic comprises a quality of service requirement of the traffic, a latency constraint of the traffic, and/or a traffic load of the traffic. In any one of the preceding examples, or in another example, the waveform selection criteria includes a spectrum localization requirement or an adjacent channel interference rejection requirement. An apparatus for performing this method is also provided.

Embodiments of this disclosure provide a transmit point configured to establish a wireless link in a channel of the wireless network for transporting traffic to a receiving device. The transmit point is further configured to identify a plurality of candidate waveforms in accordance with at least one of a capability of the receiving device and a transmission capability of the transmit point, select one of the plurality of candidate waveforms in accordance with a waveform selection criteria, and perform a transmission in accordance with the selected candidate waveform. In one example, the transmit point identifies the plurality of candidate waveforms by determining a Peak-to-Average-Power-Ratio (PAPR) tolerance of the transmit point, and identifying candidate waveforms, out of a plurality of possible waveforms, having PAPR characteristics within the PAPR tolerance of the transmit point, where waveforms having PAPR characteristics beyond the PAPR tolerance of the transmit point are excluded from the plurality of candidate waveforms. In the same example, or another example, the waveform selection criteria includes a traffic characteristic of the traffic or an application type of the traffic. In any one of the preceding examples, or in another example the transmit point selects one of the plurality of candidate waveforms by determining, in accordance with the traffic characteristic or application type, whether grant-based access or grant-less access is better suited for transporting the traffic, selecting one of the plurality of candidate waveforms that offers grant-less access in response to determining that grant-less access is better suited for transporting the traffic, and selecting one of the plurality of candidate waveforms that offers grant-based access in response to determining that grant-based access is better suited for transporting the traffic. In any one of the preceding examples, or in another example waveforms offering grant-based access require that scheduling information be communicated to the receiving device before communicating the traffic, and waveforms offering grant-less access do not require that scheduling information be communicated to the receiving device before communicating the traffic.

In accordance with another embodiment, an apparatus provided that is configured to receive, from a transmit point, a grant request for communicating traffic in a channel of a wireless network, established a wireless link in the channel; identify a plurality of candidate waveforms in accordance with a capability of the transmit point, select one of the plurality of candidate waveforms in accordance with a traffic characteristic of the traffic, send a grant response identifying the selected candidate waveform, and receive, from the transmit point, a transmission carried by the selected candidate waveform, wherein the transmission includes the traffic. In one example, the apparatus identifies the plurality of candidate waveforms in accordance with the capability of the transmit point by determining a Peak-to-Average-Power-Ratio (PAPR) tolerance of the transmit point, and identifying candidate waveforms, out of a plurality of possible waveforms, having PAPR characteristics within the PAPR tolerance of the transmit point, where waveforms having PAPR characteristics beyond the PAPR tolerance of the transmit point are excluded from the plurality of candidate waveforms.

In accordance with another embodiment, a wireless device is provided that is configured to determine, in accordance with a waveform selection criteria of traffic, that grant-less access is better suited for transporting the traffic than grant-based access, where the traffic comprises at least some data that is not classified as signaling or control information. The wireless device is further configured to transmit the traffic in a resource of a wireless channel that is reserved for grant-less waveforms, where the wireless channel comprises other resources reserved for grant-based waveforms.

In accordance with yet another embodiment, a receiving device is provided that is configured to receive a first plurality of data transmissions of a first waveform type via a channel, and receive a second plurality of data transmissions of a second waveform type that is different than the first waveform type via a channel. The second plurality of data transmissions are received over different time-frequency resources of the channel than the first plurality of data transmissions, and the first plurality of data transmissions and the second plurality of data transmissions comprise at least some data that is not classified as signaling or control information.

In one example, the receiving device is further configured to assign a first frequency band to carry the first waveform before the first plurality of data transmissions are received, and to re-assign the first frequency band to carry the second waveform after the first plurality of data transmissions are received. The first waveform and the second waveform are separated in the time domain or the spatial domain. The first plurality of data transmissions are received over the first frequency band prior to the second plurality of data transmissions are received over the first frequency band. In the same example, or in another example, the first waveform is orthogonal and the second waveform is non-orthogonal. In any one of the preceding examples, or in another example, the first waveform offers grant-less access and the second waveform offers grant-based access.

In accordance with yet another embodiment, another transmit point is provided that is configured to transmit a first data transmission using a first waveform type in a channel, and to transmit a second data transmission using a second waveform type that is different than the first waveform type in the channel. The second data transmission is transmitted over different resources of the channel than the first data transmission, and the first data transmission and the second data transmission comprise at least some data that is not classified as signaling or control information. In one example, the transmit point is further configured to assign a first frequency band to carry the first waveform before transmitting the first data transmission, and to re-assign the first frequency band to carry the second waveform after transmitting the first data transmission, where the first waveform and the second waveform are separated in the time domain or the spatial domain, and the first data transmission is transmitted over the first frequency band prior to the data transmission being transmitted over the first frequency band.

In the same example, or in another example, the first waveform is orthogonal and the second waveform is non-orthogonal. In any one of the preceding examples, or in another example, the first waveform offers grant-less access and the second waveform offers grant-based access.

In accordance with an embodiment, a method for data transmission is provided. In this embodiment, the method includes receiving an indication dynamically indicating a first waveform (WF) of at least two waveforms to use for a first data transmission, and transmitting the first data transmission using the first WF over an uplink channel based on grant based transmission of two transmission selections. The grant based transmission requiring the first UE to receive a resource grant for the first data transmission from a transmit point (TP) prior to transmitting the first data transmission over the uplink channel. The at least two waveforms further include a second waveform that is different than the first waveform. The second waveform is configured for transmitting a second data transmission over the uplink channel. The two transmission selections comprise grant less transmission that allows the first UE or a second UE to transmit the second data transmission over the uplink channel without first receiving a resource grant for the second data transmission from the TP. In one example, the method further includes transmitting the second data transmission using the second WF on the uplink channel based on the grant less transmission. In the same example, or in another example, the first data transmission and the second data transmission are transmitted by a single transmitting device to a single receiving device over different frequency bands. In any one of the preceding examples, or in another example, the first waveform and the second waveform are communicated over different time-frequency resources of the uplink channel. In any one of the preceding examples, or in another example, the first waveform has a higher Peak-to-Average-Power-Ratio (PAPR) than the second waveform. An apparatus for performing this method is also provided.

In accordance with another embodiment, another method for data transmission is provided. In this embodiment, the method includes sending an indication dynamically indicating a first waveform (WF) of at least two waveforms to use for a first data transmission, and receiving the first data transmission using the first WF over an uplink channel based on grant based transmission of two transmission selections. The grant based transmission requires the first UE to receive a resource grant for the first data transmission from a transmit point (TP) prior to transmitting the first data transmission over the uplink channel. The at least two waveforms further include a second waveform that is different than the first waveform. The second waveform is configured for transmitting a second data transmission over the uplink channel. The two transmission selections comprises grant less transmission that allows the first UE or a second UE to transmit the second data transmission over the uplink channel without first receiving a resource grant for the second data transmission from the TP. In one example, the first data transmission and the second data transmission are transmitted by the first UE to the transmitting device over different frequency bands. In another example, the second data transmission is transmitted by the second UE over different a frequency band than the first data transmission. In any one of the preceding examples, or in another example, the first waveform and the second waveform are communicated over different time frequency resources in the uplink channel. In any one of the preceding examples, or in another example, the first waveform has higher Peak-to-Average-Power-Ratio (PAPR) than the second waveform. An apparatus for performing this method is also provided.

What is claimed is:

1. A method for data transmission, the method comprising:
    establishing, by a first user equipment (UE), an uplink wireless link between the first UE and a transmit point (TP);
    receiving, by the first UE from the TP, an indication dynamically indicating a first waveform (WF) of at least two waveforms to use for a first data transmission; and
    transmitting, by the first UE to the TP, the first data transmission using the first WF over the uplink wireless link using a first time frequency resource based on grant based transmission of two transmission selections, the grant based transmission requiring the first UE to receive a first resource grant for the first data transmission from the TP prior to transmitting the first data transmission over the first time frequency resource,
    wherein the at least two waveforms further include a second WF for transmitting a second data transmission to the TP over the uplink wireless link using a second time frequency resource based on a grant less transmission of the two transmission selections,
    wherein the grant less transmission allows the first UE or a second UE to transmit the second data transmission over the second time frequency resource without first receiving a second resource grant for the second data transmission from the TP, and
    wherein the first data transmission and the second data transmission are transmitted over the uplink wireless link within one serving cell.

2. The method of claim 1, further comprises:
    transmitting, by the first UE, the second data transmission using the second WF on the second time frequency resource based on the grant less transmission.

3. The method of claim 1, wherein the first data transmission and the second data transmission are transmitted by the first UE to the TP over different frequency bands.

4. The method of claim 1, wherein the first waveform is different from the second WF, and the first time frequency resource is different from the second time frequency resource.

5. The method of claim 1, wherein the first waveform has a higher Peak-to-Average-Power-Ratio (PAPR) than the second WF.

6. The method of claim 1, the indication further indicating a first resource assignment to assign the first time frequency resource to carry the first WF.

7. A first user equipment (UE) comprising:
    a processor; and
    a computer readable storage medium storing programming for execution by the processor, the programming including instructions to:
        establish an uplink wireless link between the first UE and a transmit point (TP);
        receive, from the TP, an indication dynamically indicating a first waveform (WF) of at least two waveforms to use for a first data transmission; and
        transmit, to the TP, the first data transmission using the first WF over the uplink wireless link using a first time frequency resource based on grant based transmission of two transmission selections, the grant based transmission requiring the first UE to receive a first resource grant for the first data transmission from the TP prior to transmitting the first data transmission over the first time frequency resource,
        wherein the at least two waveforms further include a second WF for transmitting a second data transmission to the TP over the uplink wireless link using a second time frequency resource based on a grant less transmission of the two transmission selections,
        wherein the grant less transmission allows the first UE or a second UE to transmit the second data transmission over the second time frequency resource without first receiving a second resource grant for the second data transmission from the TP, and
        wherein the first data transmission and the second data transmission are transmitted over the uplink wireless link within one serving cell.

8. The first UE of claim 7, the programming further including instructions to:
    transmit the second data transmission using the second WF on the second time frequency resource based on the grant less transmission.

9. The first UE of claim 7, wherein the first data transmission and the second data transmission are transmitted by the first UE to the TP over different frequency bands.

10. The first UE of claim 7, wherein the first waveform is different from the second WF, and the first time frequency resource is different from the second time frequency resource.

11. The first UE of claim 7, wherein the first waveform has a higher Peak-to-Average-Power-Ratio (PAPR) than the second WF.

12. A method for data transmission, the method comprising:
establishing, by a transmit point (TP), an uplink wireless link between a first UE and the TP;
sending, by the TP to the first UE, an indication dynamically indicating a first waveform (WF) of at least two waveforms to use for a first data transmission; and
receiving, by the TP from the first UE, the first data transmission using the first WF over the uplink wireless link using a first time frequency resource based on grant based transmission of two transmission selections, the grant based transmission requiring the first UE to receive a first resource grant for the first data transmission from the TP prior to transmitting the first data transmission over the first time frequency resource,
wherein the at least two waveforms further include a second waveform for transmitting a second data transmission to the TP over the uplink wireless link using a second time frequency resource based on a grant less transmission of the two transmission selections,
wherein the grant less transmission allows the first UE or a second UE to transmit the second data transmission over the second time frequency resource without first receiving a second resource grant for the second data transmission from the TP, and
wherein the first data transmission and the second data transmission are received over the uplink wireless link within one serving cell.

13. The method of claim 12, wherein the first data transmission and the second data transmission are received by the TP from the first UE over different frequency bands.

14. The method of claim 12, wherein the second data transmission is received from the second UE over a different frequency band than the first data transmission.

15. The method of claim 12, wherein the first waveform is different from the second waveform, and the first time frequency resource is different from the second time frequency resource.

16. The method of claim 12, wherein the first waveform has higher Peak-to-Average-Power-Ratio (PAPR) than the second waveform.

17. A transmit point (TP) comprising:
a processor; and
a computer readable storage medium storing programming for execution by the processor, the programming including instructions to:
establish an uplink wireless link between a first UE and the TP;
send, by the TP to the first UE, an indication dynamically indicating a first waveform (WF) of at least two waveforms to use for a first data transmission; and
receive, by the TP from the first UE, the first data transmission using the first WF over the uplink wireless link using a first time frequency resource based on grant based transmission of two transmission selections, the grant based transmission requiring the first UE to receive a first resource grant for the first data transmission from the TP prior to transmitting the first data transmission over the first time frequency resource,
wherein the at least two waveforms further include a second waveform, for transmitting a second data transmission to the TP over the uplink wireless link using a second time frequency resource based on a grant less transmission of the two transmission selections,
wherein the grant less transmission allowing the first UE or a second UE to transmit the second data transmission over the second time frequency resource without first receiving a second resource grant for the second data transmission from the TP, and
wherein the first data transmission and the second data transmission are received over the uplink wireless link within one serving cell.

18. The TP of claim 17, wherein the first data transmission and the second data transmission are received from the first UE to the TP over different frequency bands.

19. The TP of claim 17, wherein the second data transmission is received by the TP from the second UE over different frequency bands than the first data transmission.

20. The TP of claim 17, wherein the first waveform is different from the second waveform, and the first time frequency resource is different from the second time frequency resource.

21. The TP of claim 17, wherein the first waveform has higher Peak-to-Average-Power-Ratio (PAPR) than the second waveform.

* * * * *